US009613527B2

(12) United States Patent
Pfeifle

(10) Patent No.: US 9,613,527 B2
(45) Date of Patent: Apr. 4, 2017

(54) METHOD AND APPARATUS FOR PROVIDING SMALLER INCREMENTAL UPDATES TO A NAVIGATIONAL DATABASE

(71) Applicant: HERE GLOBAL B.V., Veldhoven (NL)

(72) Inventor: Martin Pfeifle, Seewald (DE)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 14/498,758

(22) Filed: Sep. 26, 2014

(65) Prior Publication Data
US 2016/0093206 A1    Mar. 31, 2016

(51) Int. Cl.
G08G 1/00 (2006.01)
G06F 17/30 (2006.01)

(52) U.S. Cl.
CPC ......... *G08G 1/00* (2013.01); *G06F 17/30241* (2013.01); *G06F 17/30575* (2013.01)

(58) Field of Classification Search
CPC ......... G06F 17/30241; G06F 17/30283; G06F 17/30303; G06F 17/30306; G06F 17/30309; G06F 17/30312; G06F 17/30345; G06F 17/30368; G06F 17/3038; G06F 17/30575
See application file for complete search history.

(56) References Cited

U.S. PATENT DOCUMENTS 5,919,245 A * 7/1999 Nomura ................. G01C 21/32
340/990
6,343,301 B1 * 1/2002 Halt .................. G06F 17/30241
701/450

6,523,036 B1 * 2/2003 Hickman et al. ............. 707/704
7,945,668 B1 * 5/2011 Nucci et al. ................. 709/225
(Continued)

FOREIGN PATENT DOCUMENTS

CN    102436002 A  *  5/2012
CN    102788586 A  *  11/2012
EP    2589932 A1     5/2013

OTHER PUBLICATIONS

European Office Action for related European Patent Application No. 15184970.0-1951 dated Feb. 25, 2016, 6 Pages.

*Primary Examiner* — Jerrah Edwards
*Assistant Examiner* — Tamara Weber
(74) *Attorney, Agent, or Firm* — Ditthavong & Steiner, P.C.

(57) ABSTRACT

An approach is provided for determining at least one first cluster set associated with at least one database of one or more navigable links at a first time period and at least one second cluster set associated with the at least one database at a second time period, wherein the at least one first cluster set and the at least one second cluster set include one or more clusters of the one or more navigable links. The approach involves causing, at least in part, a computation of a minimal matching between at least one first cluster set and the at least one second cluster set. The approach also involves causing, at least in part, a renaming of the one or more clusters in the at least one first cluster set, the at least one second cluster set, or a combination thereof based, at least in part, on the minimal matching, wherein the one or more clusters organize the one or more navigable links based, at least in part, on traffic pattern information.

10 Claims, 16 Drawing Sheets

(56) References Cited

U.S. PATENT DOCUMENTS

| | | | |
|---|---|---|---|
| 8,228,803 B1 | 7/2012 | Ge et al. | |
| 9,140,558 B2* | 9/2015 | Snyder | G01C 21/165 |
| 2004/0085227 A1* | 5/2004 | Mikuriya | G01C 21/32 |
| | | | 340/995.14 |
| 2006/0155761 A1* | 7/2006 | Van De Sluis et al. | 707/104.1 |
| 2009/0187336 A1* | 7/2009 | Kawamata | G01C 21/32 |
| | | | 701/532 |
| 2010/0076671 A1 | 3/2010 | Pryakhin et al. | |
| 2011/0137546 A1 | 6/2011 | Roesser et al. | |
| 2011/0179080 A1* | 7/2011 | Miyazaki et al. | 707/772 |
| 2012/0023107 A1* | 1/2012 | Nachnani et al. | 707/748 |
| 2013/0083806 A1 | 4/2013 | Suarez Fuentes et al. | |
| 2013/0117321 A1* | 5/2013 | Fischer | G01C 21/32 |
| | | | 707/792 |
| 2013/0238626 A1* | 9/2013 | Denney et al. | 707/737 |
| 2013/0311422 A1* | 11/2013 | Walker et al. | 707/609 |
| 2014/0052763 A1* | 2/2014 | Sato | G06F 3/0488 |
| | | | 707/805 |
| 2014/0101096 A1 | 4/2014 | Pfeifle et al. | |
| 2014/0236882 A1* | 8/2014 | Rishe | G06F 17/30477 |
| | | | 706/50 |

* cited by examiner

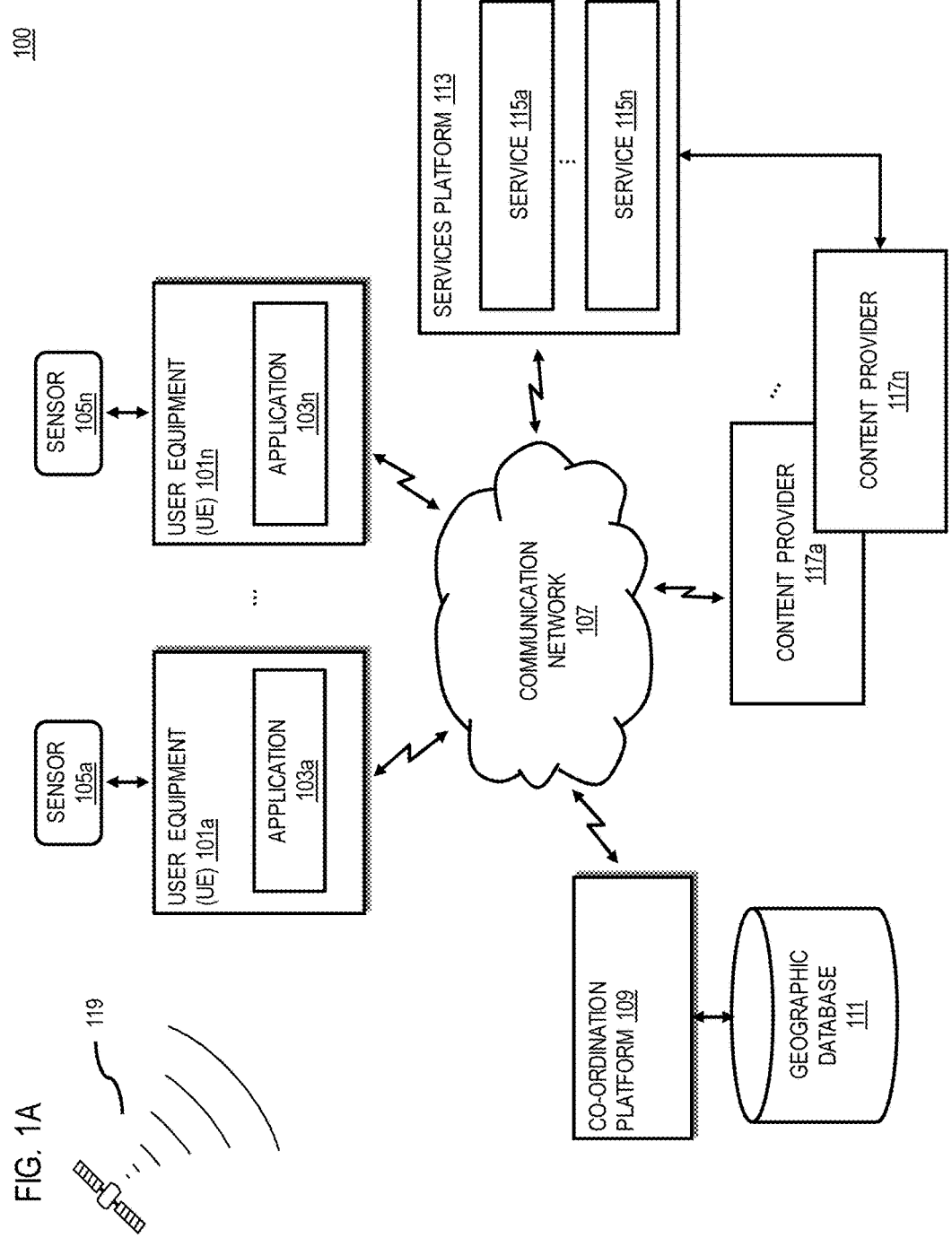

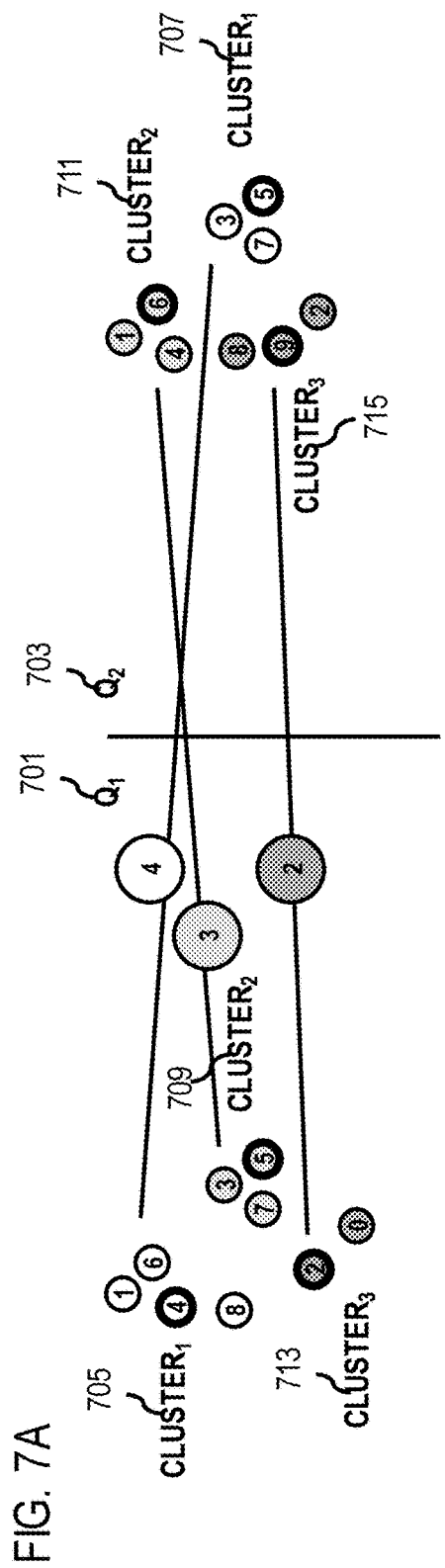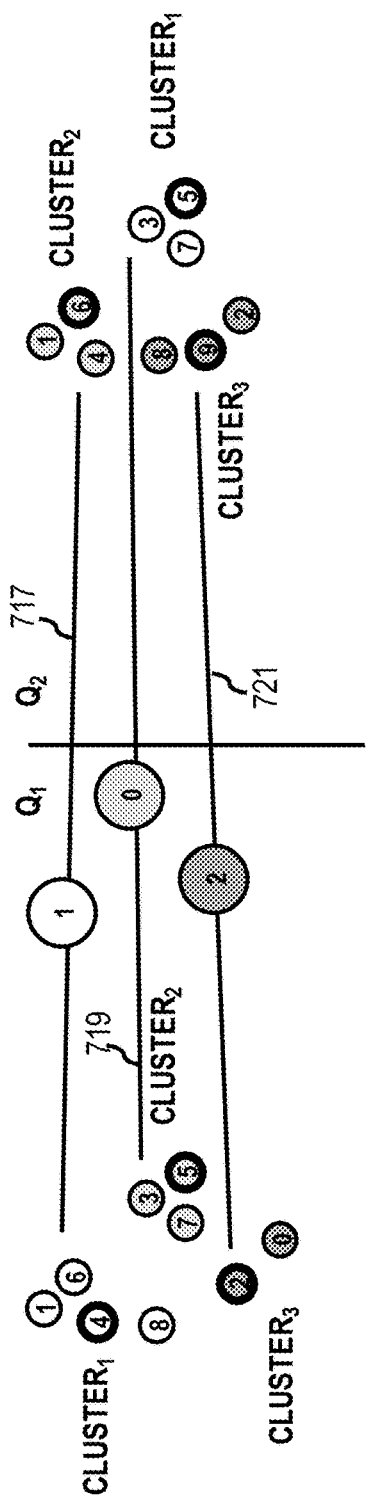

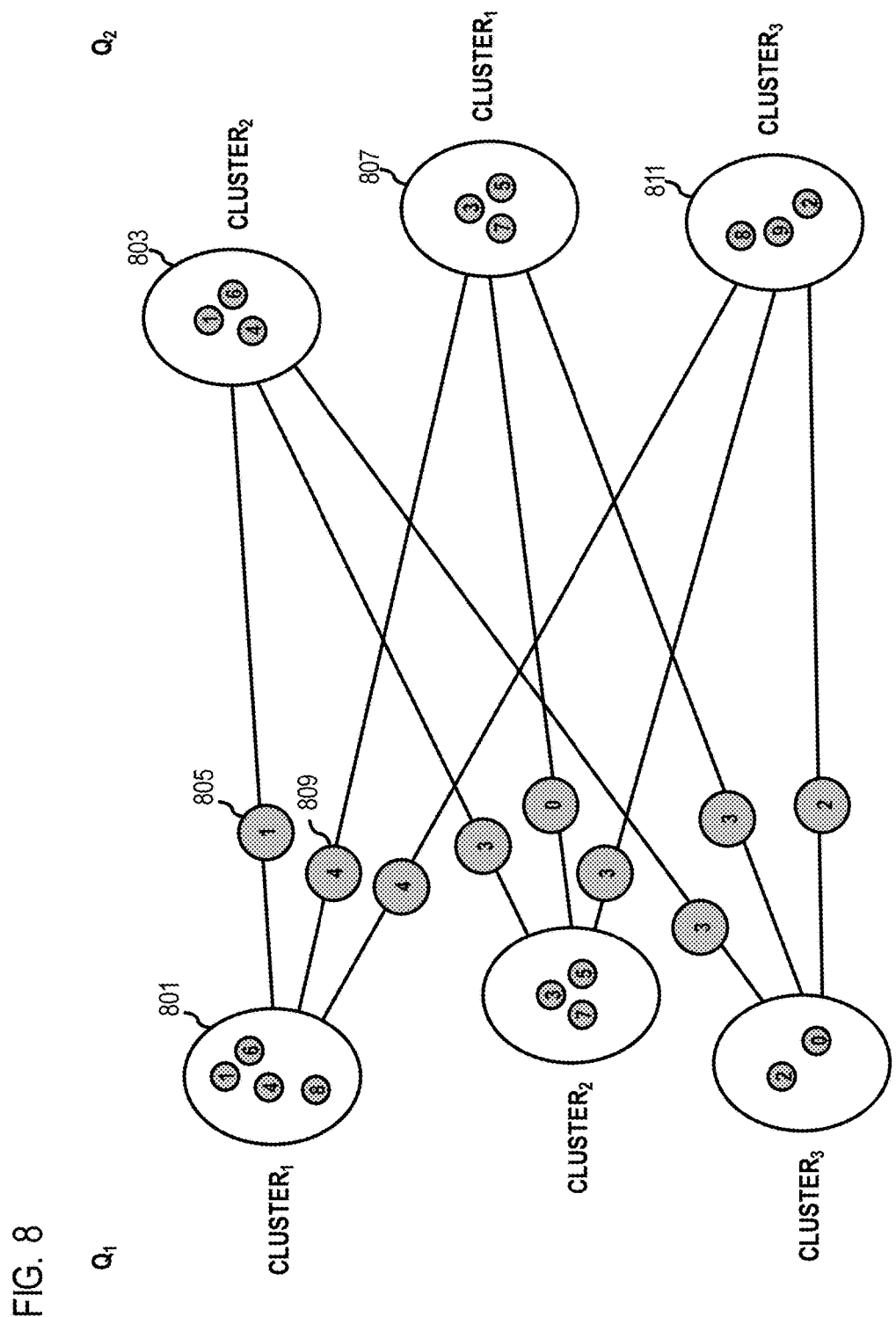

METHOD AND APPARATUS FOR PROVIDING SMALLER INCREMENTAL UPDATES TO A NAVIGATIONAL DATABASE

BACKGROUND

The traffic data is constantly changing, an increase in the number of vehicles traveling in the congested transportation networks is stimulating such change. Accordingly, traffic data is being collected at an unprecedented scale to procure accurate information pertaining to traffic conditions. Needless to mention, location inaccuracies are unacceptable while assisting users in making an informed decision regarding their travel. Since, the navigation database needs to be updated instantaneously to reflect the changes in traffic conditions, service providers are collecting voluminous traffic data in real-time. However, it is inefficient to store complete time series traffic data for each road segments as it results in huge navigation database. One of the key performance indicators regarding the updatability of the underlying navigation database is for the update package to be as small as possible.

SOME EXAMPLE EMBODIMENTS

Therefore, there is a need for an approach for causing a minimal matching and/or renaming of one or more clusters representing various traffic patterns to reduce the value of quality indicator to provide for smaller incremental updates.

According to one embodiment, a method comprises determining at least one first cluster set associated with at least one database of one or more navigable links at a first time period and at least one second cluster set associated with the at least one database at a second time period, wherein the at least one first cluster set and the at least one second cluster set include one or more clusters of the one or more navigable links. The method also comprises causing, at least in part, a computation of a minimal matching between at least one first cluster set and the at least one second cluster set. The method further comprises causing, at least in part, a renaming of the one or more clusters in the at least one first cluster set, the at least one second cluster set, or a combination thereof based, at least in part, on the minimal matching.

According to another embodiment, an apparatus comprises at least one processor, and at least one memory including computer program code for one or more computer programs, the at least one memory and the computer program code configured to, with the at least one processor, cause, at least in part, the apparatus to determine at least one first cluster set associated with at least one database of one or more navigable links at a first time period and at least one second cluster set associated with the at least one database at a second time period, wherein the at least one first cluster set and the at least one second cluster set include one or more clusters of the one or more navigable links. The apparatus is also caused to cause, at least in part, a computation of a minimal matching between at least one first cluster set and the at least one second cluster set. The apparatus is further caused to cause, at least in part, a renaming of the one or more clusters in the at least one first cluster set, the at least one second cluster set, or a combination thereof based, at least in part, on the minimal matching.

According to another embodiment, a computer-readable storage medium carries one or more sequences of one or more instructions which, when executed by one or more processors, cause, at least in part, an apparatus to determine at least one first cluster set associated with at least one database of one or more navigable links at a first time period and at least one second cluster set associated with the at least one database at a second time period, wherein the at least one first cluster set and the at least one second cluster set include one or more clusters of the one or more navigable links. The apparatus is also caused to cause, at least in part, a computation of a minimal matching between at least one first cluster set and the at least one second cluster set. The apparatus is further caused to cause, at least in part, a renaming of the one or more clusters in the at least one first cluster set, the at least one second cluster set, or a combination thereof based, at least in part, on the minimal matching.

According to another embodiment, an apparatus comprises means for determining at least one first cluster set associated with at least one database of one or more navigable links at a first time period and at least one second cluster set associated with the at least one database at a second time period, wherein the at least one first cluster set and the at least one second cluster set include one or more clusters of the one or more navigable links. The apparatus also comprises means for causing, at least in part, a computation of a minimal matching between at least one first cluster set and the at least one second cluster set. The apparatus further comprises means for causing, at least in part, a renaming of the one or more clusters in the at least one first cluster set, the at least one second cluster set, or a combination thereof based, at least in part, on the minimal matching.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of causing a minimal matching and/or renaming of one or more clusters representing various traffic patterns to reduce the value of quality indicator to provide for smaller incremental updates, according to one embodiment;

FIG. 7A represent a scenario wherein one or more clusters are being arbitrarily matched, according to one example embodiment;

FIG. 7B depict the optimal matching of the clusters which leads to a minimal overall cost, according to one example embodiment;

FIG. 8 represent a complete weighted bipartite graph between two consecutive clustering, according to one example embodiment;

DESCRIPTION OF SOME EMBODIMENTS

Figure 1B:
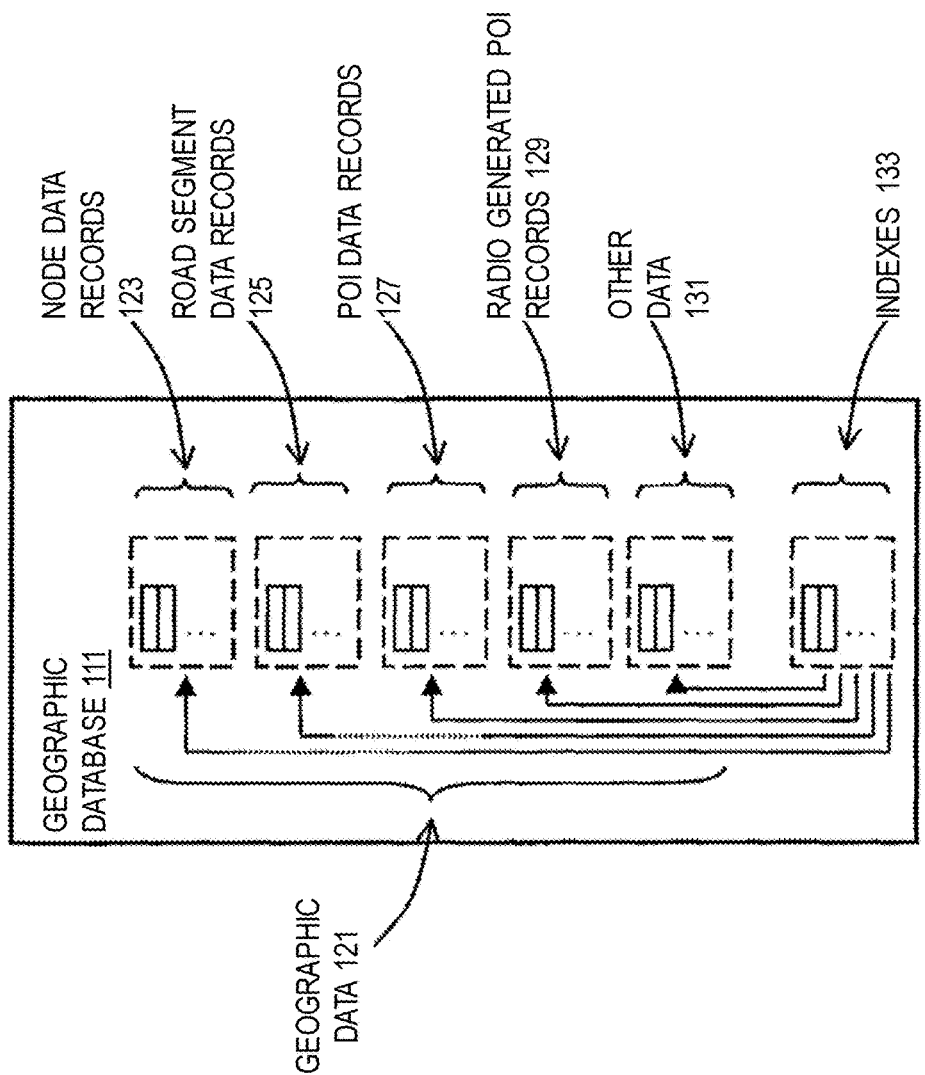
FIG. 1B is a diagram of the geographic database 111 of system 100, according to exemplary embodiments.

Examples of a method, apparatus, and computer program for causing a minimal matching and/or renaming of one or more clusters representing various traffic patterns to reduce the value of quality indicator to provide for smaller incremental updates are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system capable of causing a minimal matching and/or renaming of one or more clusters representing various traffic patterns to reduce the value of quality indicator to provide for smaller incremental updates, according to one embodiment. One area of interest amongst service providers has been accurate and efficient collection and processing of traffic data for determining real-time traffic conditions, for example navigation assistance, may be provided to users to improve the quality of their travels. Historic traffic patterns, also called speed profiles, are used in navigation databases to optimize routing. By using these historic traffic patterns, a navigation system can avoid reoccurring traffic jams. For instance, a user may encounter traffic jams at roads heading into big cities every Monday to Friday between 8 a.m. and 9 a.m. Based on historic traffic patterns, the navigation system may calculate a different route to a city center on Monday morning as opposed to the one on Saturday morning.

In one scenario, the historic traffic patterns are typically represented by a 7×24×4 dimensional float or integer vector. Each dimension of the vector corresponds to the speed of a certain quarter of an hour of a week, for example, the first dimension may reflect the speed from 0:00 to 0:15 a.m. on Monday morning and the $25^{th}$ dimension may represent the speed from 0:00 to 0:15 a.m. on Tuesday morning. However, storing for each navigable link in a database a dedicated traffic pattern of its own would lead to huge navigation databases. For example, a country may have around 100 million links. If the navigation system stores for each link its own traffic patterns, the database size pertaining to the traffic patterns may be around 100,000,000×(7×24×4)×4 bytes (assuming the value stored in each dimension of the traffic vectors is represented by a 4 byte integer value), i.e., around 250 gigabytes.

In order to reduce the database size, the traffic patterns are clustered. Based on a suitable distance measure between two traffic patterns, for example, the system 100 may want to use the Maximum ($L_1$) or Euclidean ($L_2$) distance to describe the similarity between two traffic patterns, and groups of similar traffic patterns can be generated. Furthermore, the system 100 can derive a suitable representative from each of these clusters. There are numerous algorithms around for clustering of time series, some are error-bound and some are size-bound, i.e., the system can either define the maximum allowed error (maximum distance between a traffic pattern and the traffic pattern which serves as cluster representative) or can define the overall number of allowed clusters, i.e., the maximum allowed number of traffic patterns serving as cluster representatives.

In one scenario, the result may always be depicted in two relations: ProfileTable (ProfileID, ProfilData) and a table Link2ProfileTable (LinkID, ProfileID). Let P be the number of profiles and L be the number of links and assume we can express the ProfileID by 2 bytes and the LinkIDs by 4 bytes. Then, the size of the DB can be computed by: $P \times (7 \times 24 \times 4 + 2) + L \times (2+4)$.

Besides good routing functionality, a further key feature of modern navigation systems is the updatability of the underlying navigation database. One of the key performance indicators of incremental update is that the update package for the navigation database should be as small as possible. There have been numerous instances where clienteles complained with regards to the size of an incremental update package for the routing database due to the updating of the historic traffic patterns.

A straightforward solution to the discussed problem is to compute all possible reordering/renaming the clusterings which leads to different values for a quality indicator, and then take the renaming which leads to the lowest value. Although this would yield the optimal result it is not practicable because too many different renaming exist. If one has P clusters, then P! many renamings/reorderings of the clusters are possible. In typical products, we have around 1000 traffic pattern representatives, i.e. clusters. It is impossible to compute the Quality Indicator for $1000! = 4*10^{2567}$ many reorderings. The system 100 presents a solution to this problem which also computes the optimal renaming of the clusters but in $O(P^3)$ time rather than in $O(P!)$ time.

In one embodiment, the system 100 may cause the incremental update package related to traffic patterns become smaller. The system 100 may model two different deliveries of traffic pattern data as two different clusterings where each of the clustering consists of a set of clusters. In one scenario, the system 100 may introduce a suitable distance function between two clusters, for example, cluster C and C' of the different clusterings. In other words, minimal numbers of updates, addition and/or deletion operations may be incorporated to transform cluster C into cluster C'. Then, the system 100 may create a complete weighted bipartite graph between the clusters from the two clusterings based, at least in part, on the distance function. The system 100 may add dummy clusters to achieve equal cardinality between the clustering. Subsequently, the system 100 may compute the minimal matching for the weighted bipartite graph. The system 100 may re-enumerate the clusters in the newer clustering according to the minimal matching.

The system 100 comprises of a UE 101*a*-101*n* (hereinafter UE 101). By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

The system 100 comprises of applications 103*a*-103*n* (hereinafter applications 103). By way of example, the applications 103 may be any type of application that is executable at the UE 101, such as location-based service applications, navigation applications, mapping application, GIS applications, sensor monitoring applications, calendar applications, content provisioning services, camera/imaging application, media player applications, social networking applications, and the like. In one embodiment, one of the applications 103 at the UE 101 may act as a client for the co-ordination platform 109 and may perform one or more functions associated with the functions of the co-ordination platform 109 by interacting with the co-ordination platform 109 over the communication network 107.

The system 100 comprises of sensors 105*a*-105*n* (hereinafter sensors 105). By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, Wi-Fi, Li-Fi, near field communication, etc.), temporal information sensor, a camera/imaging sensor for gathering image data, an audio recorder for gathering audio data, and the like. In one scenario, the sensors 105 may include, light sensors, orientation sensors augmented with height sensing and acceleration sensing, tilt sensors to detect the degree of incline or decline of the vehicle along a path of travel, moisture sensors, pressure sensors, etc. In one example embodiment, the UE 101 may include GPS receivers to obtain geographic coordinates from satellites 119 for determining current location and time associated with at least one UE 101.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The system 100 comprises of the co-ordination platform 109. In one embodiment, the co-ordination platform 109 may be a platform with multiple interconnected components. The co-ordination platform 109 may include multiple servers, intelligent networking devices, computing devices, components and corresponding software for causing a minimal matching and/or renaming of one or more clusters representing various traffic patterns to reduce the value of quality indicator to provide for smaller incremental updates.

In one embodiment, the co-ordination platform 109 may determine at least one first cluster set associated with at least one database of one or more navigable links at a first time period and at least one second cluster set associated with the at least one database at a second time period, wherein the at least one first cluster set and the at least one second cluster set include one or more clusters of the one or more navigable links. Then, the co-ordination platform 109 may cause, at least in part, a computation of a minimal matching between at least one first cluster set and the at least one second cluster set. Subsequently, the co-ordination platform 109 may cause, at least in part, a renaming of the one or more clusters in the at least one first cluster set, the at least one second cluster set, or a combination thereof based, at least in part, on the minimal matching.

In one embodiment, the co-ordination platform 109 may model two different deliveries of traffic pattern data as two different clusterings where each of the clustering consists of a set of clusters. In one scenario, the co-ordination platform 109 may form a cluster for one or more links referring to the same traffic pattern, one or more links in the database, or a combination thereof. In another embodiment, the co-ordination platform 109 may define a suitable distance measure between two clusters of two different quarters. In one scenario, the co-ordination platform 109 may introduce a suitable distance function between two clusters C and C' of the different clusterings, i.e., the minimal number of updates, add and delete operations to transform cluster C into cluster C', and vice-versa. In a further embodiment, the co-ordination platform 109 may create a complete weighted bipartite graph between the clusters from the two cluster sets based on the distance function, if necessary dummy clusters may be added to achieve equal cardinality between the cluster sets. Then, the co-ordination platform 109 may compute the minimal matching between all clusters from one quarter to all clusters of another quarter. Subsequently, the co-ordination platform 109 may rename the clusters according to the minimal matching. In one scenario, renaming and/or a suitable update package is computed on the co-ordination platform 109. The update package may consist of a binary diff of the geographic databases 111 or of a set of SQL commands. Such an update package is sent to the UE 101 for patching the navigation database on the UE 101 for further processing and/or presentation. Alternatively, the update package might be sent to the content provider 117 and/or services platform 113 for patching the navigation database, for further processing and/or presentation.

In one embodiment, the co-ordination platform 109 may include or have access to geographic database 111 to access or store any kind of data, such as traffic conditions, routing information, location information, temporal information, contextual information, etc. Data stored in the geographic database 111 may, for instance, be provided by the UE 101, the sensors 105, the services platform 113, one or more services 115a-115n (or services 115), or one or more content providers 117a-117n (or content providers 117).

The services platform 113 may include any type of service. By way of example, the services platform 113 may include mapping services, navigation services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the co-ordination platform 109 and the content providers 117 to supplement or aid in the processing of the content information (e.g., location information).

In one embodiment, the services 115 may be an online service that reflects interests and/or activities of users. In one scenario, the services 115 provide representations of each user (e.g., a profile), his/her social links, and a variety of additional information. The services 115 allow users to share location information, navigation related information, activities information, contextual information, historical user information and interests within their individual networks, and provides for data portability.

The content providers 117 may provide content to the UE 101, the co-ordination platform 109, and the services 115 of the services platform 113. The content provided may be any type of content, such as textual content, image content, video content etc. In one embodiment, the content providers 117 may provide content that may supplement content of the applications 103, sensors 105, or a combination thereof. By way of example, the content providers 117 may provide content that may aid in the processing of the location information to determine routing information, traffic conditions, etc. In another embodiment, the content providers 117 may also store content associated with the UE 101, the co-ordination platform 109, and the services 115 of the services platform 113. In a further embodiment, the content providers 117 may manage access to a central repository of data, and offer a consistent, standard interface to data.

By way of example, the UE 101, the co-ordination platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, radio generated POI records 129, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). In addition, the geographic database 111 can include data from radio advertisements associated with the POI data records 127 and their respective locations in the radio generated POI records 129. By way of example, a street is determined from the user interaction with the UE 101 and the content information associated with the UE 101, according to the various embodiments described herein.

The geographic database 111 can be maintained by the content provider in association with the services platform 113 (e.g., a map developer). The map developer can collects geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the end user device 101 to provide an end user with navigation features. In such a case, the geographic database 111 can be downloaded or stored on the end user device UE 101, such as in applications 103, or the end user device UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for determination of one or more personalized routes or route segments based on one or more calculated and recorded routes, according to exemplary embodiments.

Figure 2:
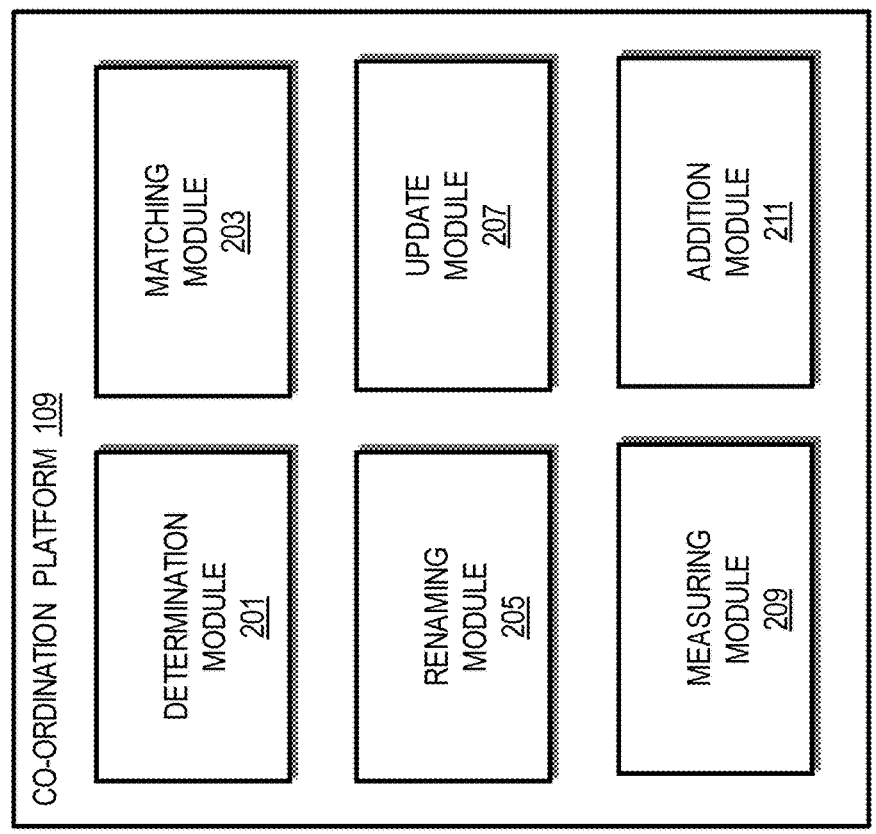
FIG. 2 is a diagram of the components of the co-ordination platform 109, according to one embodiment.

FIG. 2 is a diagram of the components of the co-ordination platform 109, according to one embodiment. By way of example, the co-ordination platform 109 includes one or more components for causing a minimal matching and/or renaming of one or more clusters representing various traffic patterns to reduce the value of quality indicator to provide for smaller incremental updates. In this embodiment, the co-ordination platform 109 includes a determination module 201, a matching module 203, a renaming module 205, an update module 207, a measuring module 209, and an addition module 211. It is contemplated that the functions of these components may be combined in one or more components or performed by other components of equivalent functionality.

In one embodiment, the determination module 201 may determine at least one first cluster set associated with at least one database of one or more navigable links at a first time period. Similarly, the determination module 201 may determine at least one second cluster set associated with the at least one database at a second time period. In another embodiment, the determination module 201 may determine minimal matching between the first cluster set and the second cluster set to cause a transformation. In a further embodiment, the determination module 201 may determine that the first cluster set and the second cluster set do not have a same cardinality of clusters.

In one embodiment, the matching module 203 may cause a computation of a minimal matching between at least one first cluster set and the at least one second cluster set. In one scenario, the computation of minimal matching is based on distance measures. In another scenario, the computation of minimal matching is based on the weighted bipartite graph.

In one embodiment, the renaming module 205 may cause a renaming of the one or more clusters in the first cluster set and/or the second cluster set based on the minimal matching. In one scenario, each cluster in the cluster set gets assigned the number of the cluster to which it is mapped from the previous clustering. Such renaming of the clusters minimizes the quality indicator with respect to the set of clusters.

In one embodiment, the update module 207 may cause a creation of at least one incremental update package to update the at least one first cluster set to the at least one second cluster set based on the renaming. In one scenario, the smaller the value of the quality indicator, the smaller is the incremental update package. In another embodiment, the update module 207 may cause minimal number of updates, addition and deletion operations to transform one cluster to another and vice-versa.

In one embodiment, the measuring module 209 may define at least one distance measure between the at least one cluster in the first cluster set and the at least one cluster in the second cluster set. In one scenario, the computation of the minimal matching is based, at least in part, on the at least one distance measure. In one scenario, the distance between two clusters may be equal to the minimal number of the elementary operations to transform one cluster into another and vice-versa, for example, delete an element from a cluster, rename an element from a cluster, and add an element to a cluster.

In one scenario, the addition module 211 may add one or more dummy clusters to the at least one first cluster set, the at least one second set, or a combination thereof. The addition of dummy cluster causes the at least one first cluster set and the at least one second cluster set to have the equal cardinality. In one scenario, dummy clusters are added to the cluster set having smaller number of clusters, until both clustering have the same cardinality.

The above presented modules and components of the co-ordination platform 109 can be implemented in hardware, firmware, software, or a combination thereof. Though depicted as a separate entity in FIG. 1A, it is contemplated that the co-ordination platform 109 may be implemented for direct operation by respective UE 101. As such, the co-ordination platform 109 may generate direct signal inputs by way of the operating system of the UE 101 for interacting with the applications 103. In another embodiment, one or more of the modules 201-211 may be implemented for operation by respective UEs, the co-ordination platform 109, or combination thereof. Still further, the co-ordination platform 109 may be integrated for direct operation with services 115, such as in the form of a widget or applet, in accordance with an information and/or subscriber sharing arrangement. The various executions presented herein contemplate any and all arrangements and models.

Figure 3:
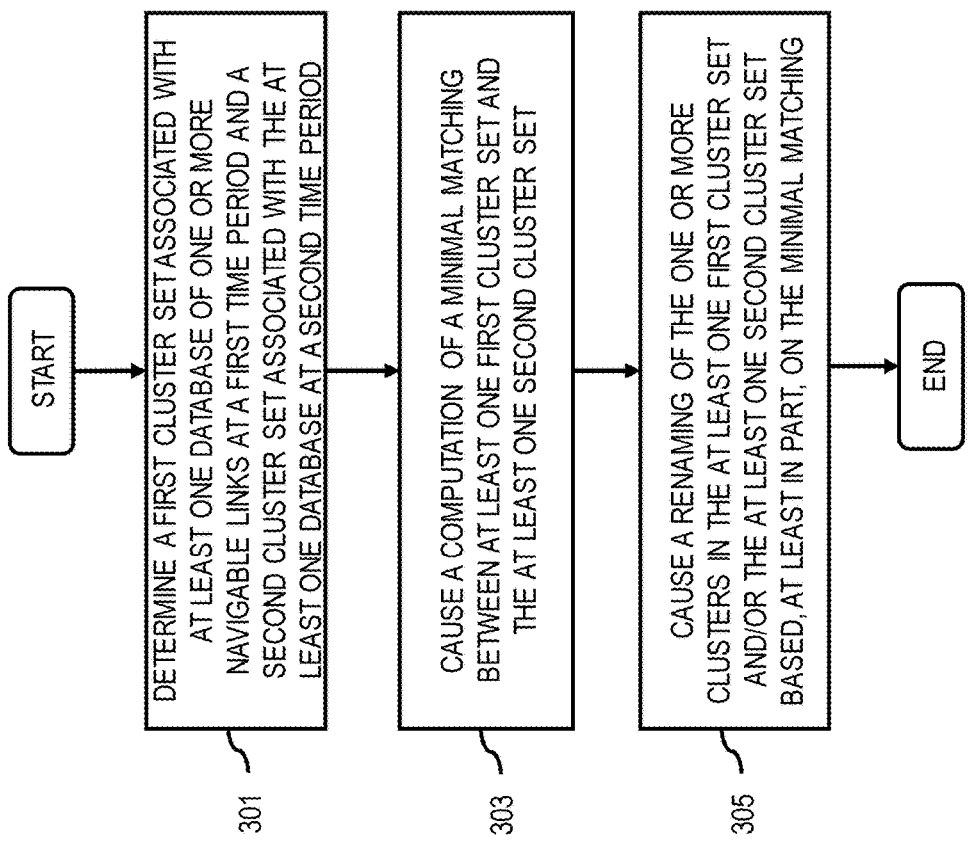
FIG. 3 is a flowchart of a process for computing minimal matching between one or more cluster sets associated with a database of one or more navigable links to cause a renaming, according to one embodiment.
Figure 13:
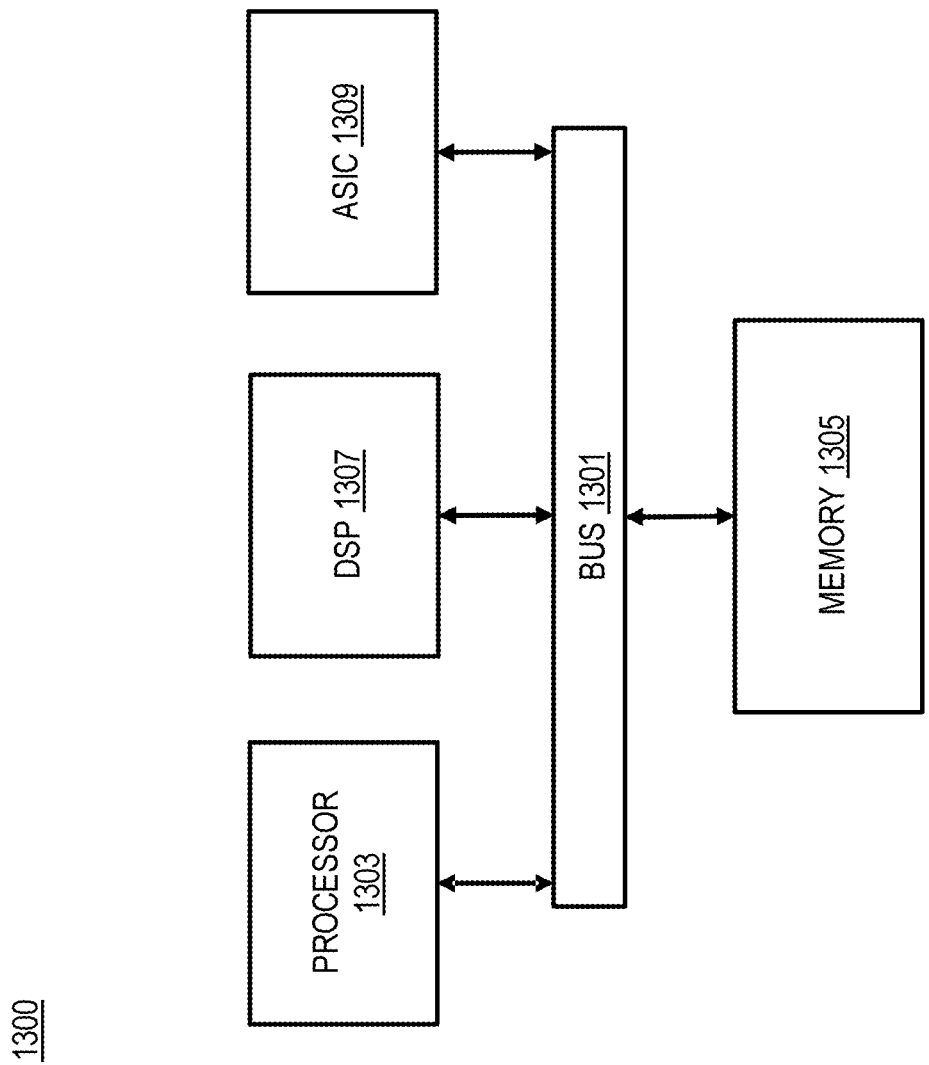
FIG. 13 is a diagram of a chip set that can be used to implement an embodiment of the invention.

FIG. 3 is a flowchart of a process for computing minimal matching between one or more cluster sets associated with a database of one or more navigable links to cause a renaming, according to one embodiment. In one embodiment, the co-ordination platform 109 performs the process 300 and is implemented in, for instance, a chip set including a processor and a memory as shown in FIG. 13.

In step 301, the co-ordination platform 109 may determine at least one first cluster set associated with at least one database of one or more navigable links at a first time period and at least one second cluster set associated with the at least one database at a second time period. In one example embodiment, to reduce the database size, the traffic patterns are clustered. The at least one first cluster set and the at least one second cluster set include one or more clusters of the one or more navigable links. The clustering algorithm for the at least one first cluster set may run completely independent from the clustering algorithm for the at least one second cluster. Despite the fact that the overall number of links and the original pattern assigned to each link would not have changed much. As a result, the co-ordination platform 109 may determine first cluster set associated with a database of one or more navigable links at a first time period. Subsequently, the co-ordination platform 109 may determine second cluster set associated with a database at a second time period. In one scenario, the one or more clusters organize the one or more navigable links based, at least in part, on traffic pattern information.

In step 303, the co-ordination platform 109 may cause, at least in part, a computation of a minimal matching between at least one first cluster set and the at least one second cluster set. In one scenario, the co-ordination platform 109 may define suitable distance measure between two clusters of two different cluster sets. Then, the co-ordination platform may compute the minimal matching between all clusters from one cluster set to all clusters of another cluster set. The minimal matching measures the clusters in different cluster sets that demonstrate similarity based on the minimal weight perfect matching. In one embodiment, the perfect matching may be done using the following algorithm wherein a bipartite graph G=(X∪Y, E) a matching of X to Y is a set of edges M⊆E such that no two edges in M share an endpoint, i.e.

$$\forall (x1,y1),(x2,y2)\in M: x1=x2 \Leftrightarrow y1=y2$$

A matching M of X to Y is maximal if there is no matching M' of X to Y such that |M|<|M'|. A maximal matching M of X to Y is called a complete matching if |M|=min {|X|,|Y|}. In the case |X|=|Y| a complete matching is also called a perfect matching.

In another embodiment, a minimum weight perfect matching may be calculated by using the algorithm wherein a weighted bipartite graph G=(X∪Y, E) together with a weight function w: E→IR. In one scenario, a perfect matching M, a minimum weight perfect matching, if for any other perfect matching M', the following inequality holds:

$$\sum_{(x,y)\in M} w(x,y) \le \sum_{(x,y)\in M'} w(x,y)$$

In one scenario, a complete bipartite graph G=(X∪Y, E) between two vector sets X, Y ⊂ IR$^d$ with |X|, |Y|≤k. With set X'=X×{1} and Y'=Y×{2} in order to fulfill the property X'∩Y'=∅. The weight of each edge (($\vec{x}$, 1), ($\vec{y}$, 2)) in this graph G is defined by the distance dist($\vec{x}$,$\vec{y}$) between the vectors $\vec{x}$∈X' and $\vec{y}$∈Y'. For example the Euclidian distance can be used here. A perfect matching is a subset M⊆X'×Y' that connects each $\vec{x}$∈X' to exactly one $\vec{y}$∈Y' and vice versa. A minimal weight perfect matching is a matching with maximum cardinality and a minimum sum of weights of its edges. Since a perfect matching can only be found for sets of equal cardinality, it is necessary to introduce weights for unmatched nodes when defining a distance measure.

In a further embodiment, the co-ordination platform 109 may cause an arbitrary matching, an optimal matching, or a combination thereof between at least one first cluster set and the at least one second cluster set.

In step 305, the co-ordination platform 109 may cause, at least in part, a renaming of the one or more clusters in the at least one first cluster set, the at least one second cluster set, or a combination thereof based, at least in part, on the minimal matching. In one scenario, the renaming of the one or more clusters are performed in an order determined based, at least in part, on an overall runtime complexity of one or more algorithms associated with the computation of the minimal matching. In another scenario, the renaming of the one or more clusters includes, at least in part, a re-enumeration of the one or more clusters respectively in the at least one first cluster set, the at least one second cluster set, or a combination thereof.

Figure 4:
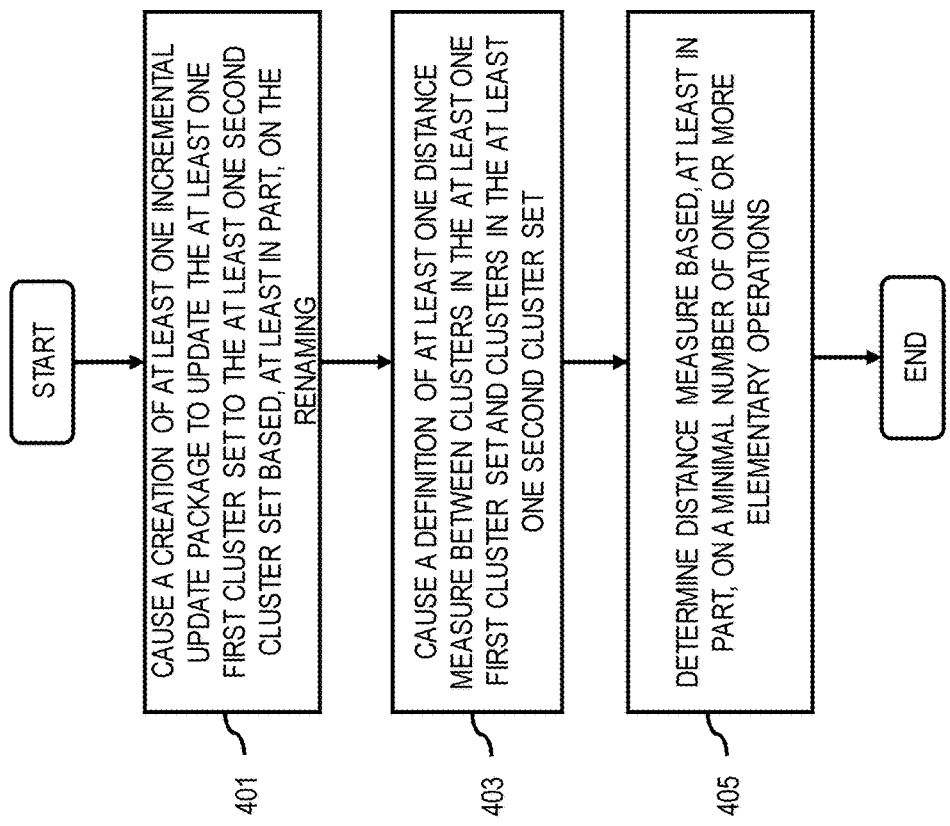
FIG. 4 is a flowchart of a process for causing a transformation of one cluster set to another cluster set, according to one embodiment.

FIG. 4 is a flowchart of a process for causing a transformation of one cluster set to another cluster set, according to one embodiment. In one embodiment, the co-ordination platform 109 performs the process 400 and is implemented in, for instance, a chip set including a processor and a memory as shown in FIG. 13.

In step 401, the co-ordination platform 109 may cause, at least in part, a creation of at least one incremental update package to update the at least one first cluster set to the at least one second cluster set based, at least in part, on the renaming. In one scenario, the co-ordination platform 109 may rename the clusters in at least one cluster set based on the minimal matching. The cluster in the cluster set gets assigned a number of the cluster to which it is mapped. In one scenario, the smaller the value of the quality indicator, the smaller the incremental update package. The update package for the navigation database should be as small as possible. In another scenario, this increases the acceptance of data updates as the required bandwidth between server and target/client is reduced.

In step 403, the co-ordination platform 109 may cause, at least in part, a definition of at least one distance measure between the one or more clusters in the at least one first cluster set and the one or more clusters in the at least one second cluster set, wherein the computation of the minimal matching is based, at least in part, on the at least one distance measure. The co-ordination platform 109 allows for efficient and meaningful distance computations. In one scenario, the co-ordination platform 109 may implement the Euclidean metric (L2), the Manhattan metric (L1), the Maximum metric (L∞) etc. to evaluate the feature distance between clusters. In one example embodiment, in a similarity ranking query a user may specify a query and the co-ordination platform 109 may retrieve clusters from the database ordered by their distance.

In step 405, the co-ordination platform 109 may determine the distance measure based, at least in part, on a minimal number of one or more elementary operations to cause, at least in part, a transformation of the at least one first cluster set to the at least one second cluster set. In one scenario, the one or more elementary operations include, at least in part, a delete operation, a rename operation, a add operation, or a combination thereof. In one scenario, minimal matching is a distance measure on cluster sets that demonstrates suitable for defining similarity. The one or more elementary operations (e.g., insert, delete, update etc.) are part of the distance measurement between the one or more clusters in different clusters sets. Once the distance is determined, it is used as an input for minimal matching. In one example embodiment, let V⊂IR$^d$ and let dist: IR$^d$× IR$^d$→IR be a distance function between two d-dimensional feature vectors. Let X={$\vec{x}_1$, $\vec{x}$×|X|}, Y{$\vec{y}_1$, ..., $\vec{y}$|Y|}∈2$^V$ be two vector sets. We assume w.l.o.g. |X|≤|Y|≤k. Furthermore, let w: V→IR be a weight function for the unmatched elements. Then the minimal matching distance d$^{dist,w}_{mm}$: 2V×2V→IR is defined as follows:

$$d^{dist,w}_{mm}(X, Y) = \min_{\pi \in 1\mid(Y)} \left( \sum_{i=1}^{|X|} dist(\vec{x}_i, \vec{y}_{\pi(i)}) \mid \sum_{i=|X|+1}^{|Y|} w(\vec{y}_{\pi(i)}) \right)$$

The weight function w: V→IR provides the penalty given to every unassigned element of the set having larger cardinality. The minimal matching distance is a specialization of the net flow distance (i.e., a metric and that it is computable in polynomial time).

Figure 5:
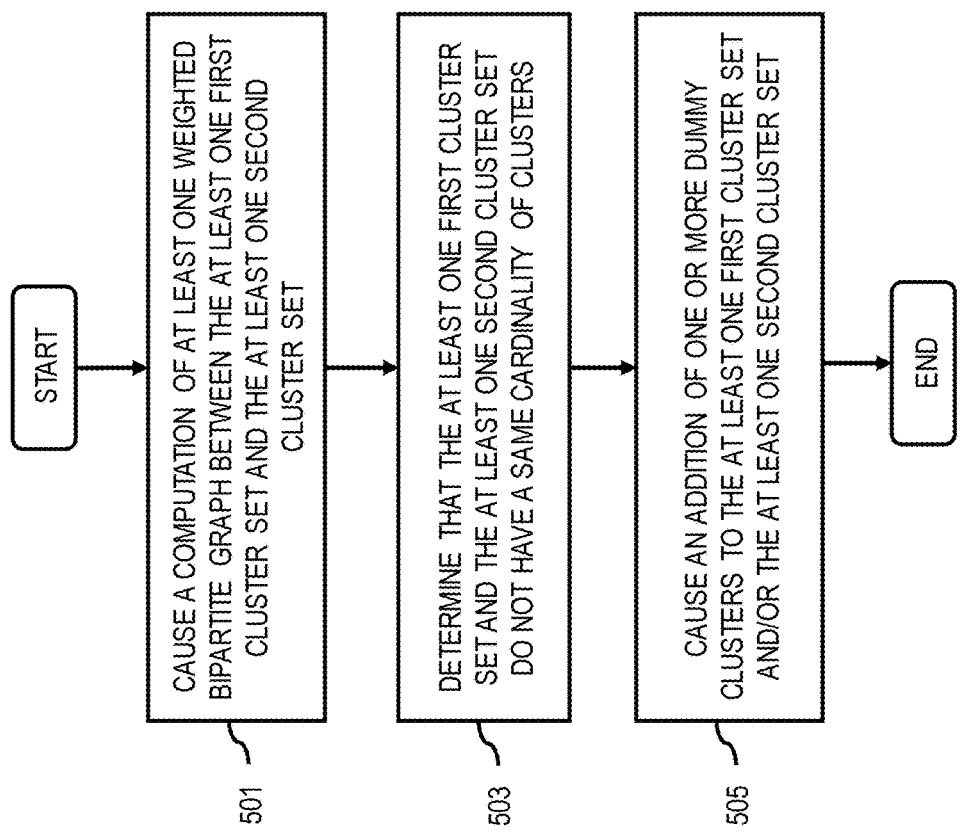
FIG. 5 is a flowchart of a process for adding dummy clusters to a cluster set with less cardinality of clusters for causing similar cardinality prior to the computation of the minimal matching, according to one embodiment.

FIG. 5 is a flowchart of a process for adding dummy clusters to a cluster set with less cardinality of clusters for causing similar cardinality prior to the computation of the minimal matching, according to one embodiment. In one embodiment, the co-ordination platform 109 performs the process 500 and is implemented in, for instance, a chip set including a processor and a memory as shown in FIG. 13.

In step 501, the co-ordination platform 109 may cause, at least in part, a computation of at least one weighted bipartite graph between the at least one first cluster set and the at least one second cluster set, wherein the minimal matching is based, at least in part, on the at least one weighted bipartite graph. In one example embodiment, A Graph G=(V, E)

consists of a (finite) set of vertices V and a set of edges E⊂V×V. A weighted graph is a graph G=(V, E) together with a weight function w: E→IR. A bipartite graph is a graph G=(X∪Y, E) with X∩Y=Ø and E⊂X×Y. A bipartite graph G=(X∪Y, E) is called complete if E=X×Y. In another example embodiment, given a bipartite graph G=(X∪Y, E) a matching of X to Y is a set of edges M⊂E such that no two edges in M share an endpoint, i.e.

$$\forall (x1,y1),(x2,y2) \in M: x1=x2 \Leftrightarrow y1=y2$$

A matching M of X to Y is maximal if there is no matching M' of X to Y such that |M|<|M'|. A maximal matching M of X to Y is called a complete matching if |M|=min{|X|,|Y|} In the case |X|=|Y| a complete matching is also called a perfect matching.

In step 503, the co-ordination platform 109 may determine that the at least one first cluster set and the at least one second cluster set do not have a same cardinality of clusters.

In step 505, the co-ordination platform 109 may cause, at least in part, an addition of one or more dummy clusters to the at least one first cluster set, the at least one second set, or a combination thereof to cause the at least one first cluster set and the at least one second cluster set to have the same cardinality prior to the computation of the minimal matching. In one example embodiment, let $V \subset IR^d$ be a set of d-dimensional vectors. Let $\|\vec{x}-\vec{y}\|2$ be the Euclidean distance between $\vec{x}-\vec{y} \in IR^d$. Furthermore, let $\vec{w} \in IR^d \backslash V$ be a "dummy" vector. Then $W\vec{w}: V \to IR: W\vec{w}(x)=\|\vec{x}-\vec{y}\|2$ denotes a set of weight functions based on dummy vectors. In one scenario, a good choice of $\vec{w}$ may be $\vec{0}$, since it has the shortest average distance within the position and has no volume. Since there are no covers having no volume in any data object, the conditions for the metric character of the minimum matching distance are satisfied.

The minimum Euclidian distance under permutation can be derived from the minimal matching distance. By selecting the squared Euclidian distance as distance measure on V and taking the squared Euclidian norm as weight function, the distance value calculated by the minimal matching distance is the same as the squared value of the minimum Euclidian distance under permutation. This follows exactly from the definitions of both distance measures. Let us note that it is necessary to extract the square root from this distance value to preserve the metric character.

Figure 6A:
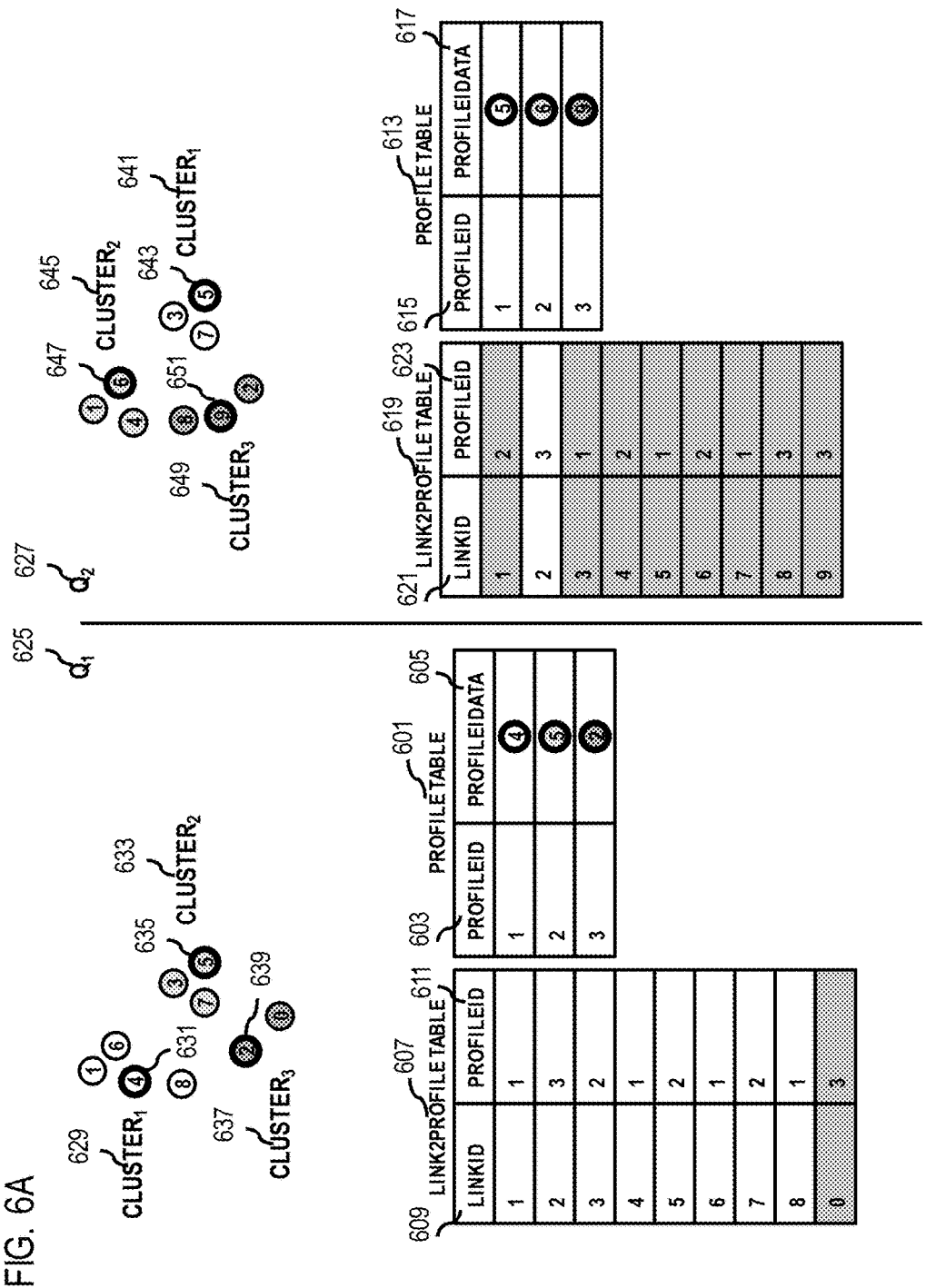
FIG. 6A is a diagram that represents clustering result of two different quarters, according to one example embodiment.

FIG. 6A is a diagram that represents clustering result of two different quarters, according to one example embodiment. In one scenario, there are two different quarterly deliveries with slightly changed data. The process of generating the tables ProfileTable [601, 613] (ProfileID [603, 615], ProfileData [605, 617]) and Link2ProfileTable [607, 619] (LinkID [609, 621], ProfileID [611, 623]) occurs for each and every data delivery. For $Q_1$ [625] the ProfileTable [601] may contain $P_1$ many speed profiles [603, 605] and the Link2ProfileTable [607] may contain $L_1$ many links [609, 611]. For $Q_2$ [627] the ProfileTable [613] may contain $P_2$ many speed profiles [615, 617] and the Link2ProfileTable [619] may contain $L_2$ many links [621, 623]. As the clustering algorithm of $Q_2$ [627] runs completely independent of the clustering algorithm of $Q_1$ [625], and does not take the results of the $Q_1$ [625] clustering algorithm into account, the generated tables ProfileTable [613] and Link2ProfileTable [619] may look completely different. Although the raw data, i.e., the overall number of links and the original pattern assigned to each link (not the link's pattern representative), wouldn't have changed much.

In one scenario, FIG. 6A depicts the situation for two clusterings results from $Q_1$ [625] and $Q_2$ [627]. The 7×24×4 dimensional vectors for traffic patterns are depicted by two-dimensional points only. On the left hand side, the situation for $Q_1$ [625] is depicted. In the database there exist 9 links and each of these links has a dedicated traffic pattern. The clustering algorithm generates 3 clusters of traffic patterns. In one scenario, cluster 1 [629] consists of the traffic patterns of Links 1, 4, 6 and 8. Cluster 1 is represented by the traffic pattern of Link 4 [631]. In another scenario, cluster 2 [633] contains the traffic patterns of Links 3, 5 and 7 and is represented by the traffic pattern of Link 5 [635]. In a further scenario, cluster 3 [637] contains the traffic patterns of Links 2 and 0 and is represented by the traffic pattern of Link 2 [639].

On the right hand side, the situation for the following quarter $Q_2$ [627] is depicted. This quarter contains 9 links with their respective traffic patterns. Again the clustering returns 3 clusters. In one scenario, cluster 1 [641] contains links 3, 5 and 7 and is represented by the traffic pattern of Link 5 [643]. In another scenario, cluster 2 [645] contains the traffic patterns of Links 4 and 6 and is represented by the traffic pattern of Link 6 [647]. In a further scenario, cluster 3 [649] contains the traffic patterns of Links 2, 8 and 9 and is represented by the traffic pattern of Link 9 [651].

Although the input data, i.e., the traffic patterns, for Links 1-8, have not changed, the content of the resulting tables Link2ProfileTable [607, 619] and the ProfileTable [601, 613] look quite different. Updating the ProfileTable [601, 613] is not that critical as the number of entries is equal to the overall number of traffic patterns P only. The number of entries in the table Link2ProfileTable [619] L is much higher. The entries that needs to be changed are highlighted. First the record 0 has to be deleted because this link does not exist anymore in the new database. Then, the cluster assignments of Links 1, 3, 4, 5, 6, 7, 8 have to be adapted and a new record for Link 9 has to be inserted.

The number of new data records can be computed by means of the following SQL statement:

```
SELECT sum (CNT) FROM
(
// Deleted elements
SELECT count (*) as CNT FROM ( SELECT LinkID FROM
Q1.LinkIDProfileTable
              MINUS
              SELECT LinkID FROM Q2.LinkIDProfileTable)
UNION ALL
// Cluster assignment changed + new records
SELECT count (*) as CNT FROM ( SELECT * FROM
Q2.LinkIDProfileTable
              MINUS
              SELECT * FROM Q1.LinkIDProfileTable)
)
```

The result of this query (hereinafter Quality indicator) is 9.

Figure 6B:
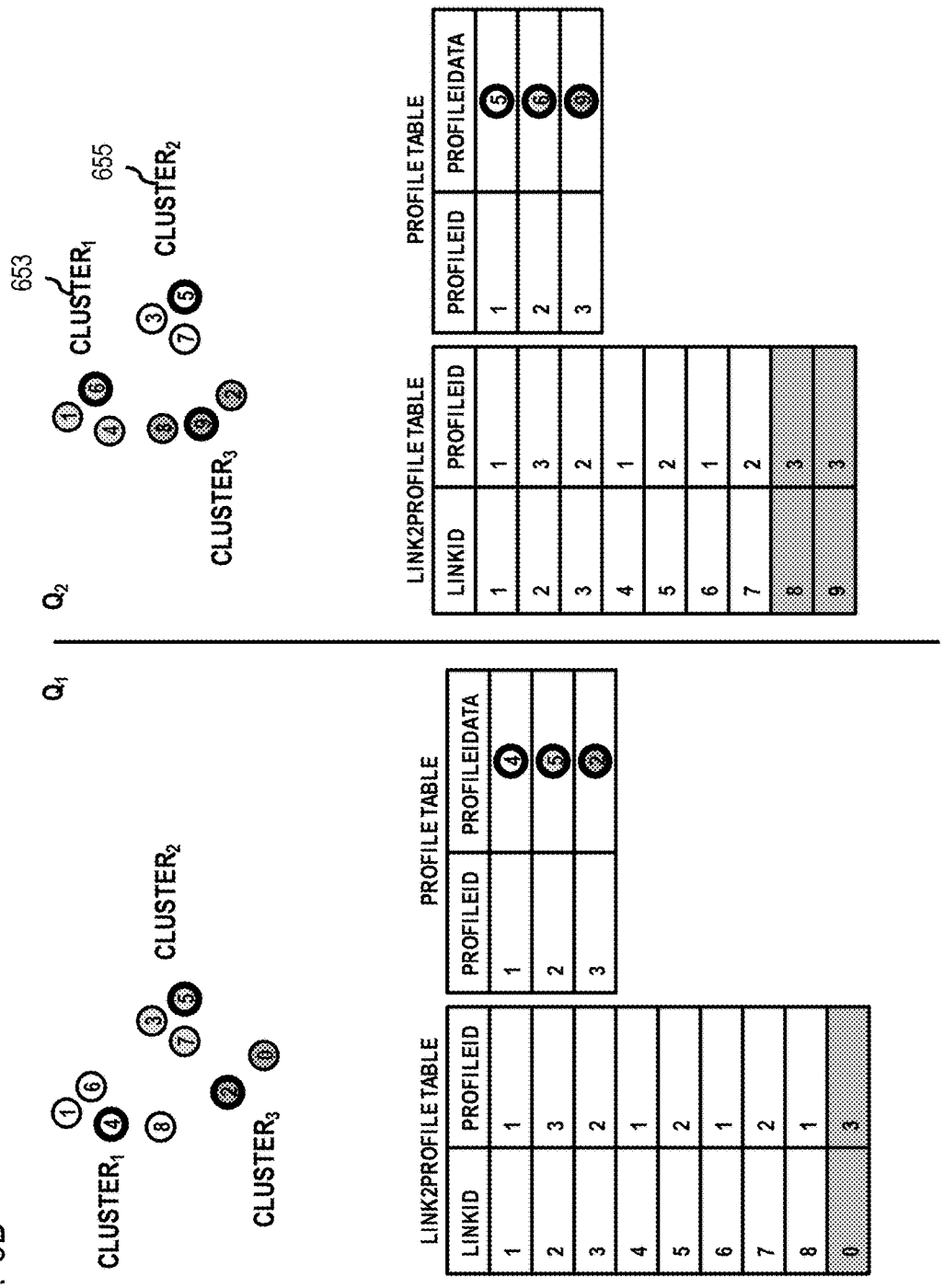
FIG. 6B is a diagram that represents a scenario wherein the clusters of a given clustering are reordered/renamed to minimize the quality indicator, according to one example embodiment.

FIG. 6B is a diagram that represents a scenario wherein the clusters of a given clustering are reordered/renamed to minimize the quality indicator, according to one example embodiment. In one scenario, the name of cluster 1 [641] may be changed to cluster 2 [645] and vice-versa, thereby reducing the quality indicator to 3. For example, cluster 1 [653] now consists of the traffic patterns of links 1, 4 and 6. The cluster 2 [655] now consists of the traffic patterns of links 3, 5 and 7. The smaller the value of the quality indicator, the smaller the incremental update package from Q1 to Q2 will be. As shown in FIG. 7, simply be renaming/reordering the clusters, the quality indicator can be dramatically improved.

Similar to FIGS. 6 A-B, FIG. 7 A-B depicts two different clusterings from two different quarters $Q_1$ [701] and $Q_2$ [703]. $Cluster_1$ [705] of $Q_1$ [701] contains the elements, i.e., Links, 1, 4, 6 and 8 and $Cluster_1$ [707] of $Q_2$ [703] contains the elements 3, 5 and 7. FIG. 7A represent a scenario wherein one or more clusters are being arbitrarily matched, according to one example embodiment. The clusters of the clustering from $Q_1$ [701] and $Q_2$ [703] are matched straightforward to each other, i.e., matching $Cluster_1$ [705] of $Q_1$ [701] to $Cluster_1$ [707] of $Q_2$ [703], $Cluster_2$ [709] of $Q_1$ [701] to $Cluster_2$ [711] of $Q_2$ [703], $Cluster_3$ [713] of $Q_1$ [701] to $Cluster_3$ [715] of $Q_2$ [703]. In one scenario, to express the quality of such a matching, distance measures between two clusterings are implemented. The distance between two clusters C and C' is equal to the minimal number of the following elementary operations to transform Cluster C into Cluster C':
1) Delete an element from Cluster C;
2) Rename an element from Cluster C;
3) Add an element to Cluster C;

In FIG. 7A, the distance between $Cluster_1$ from $Q_1$ to $Cluster_1$ from $Q_2$ equals 4 as we delete one element and rename the remaining three elements. The distance between $Cluster_2$ from $Q_1$ to $Cluster_2$ from $Q_2$ equals 3 as we have to rename all 3 elements, e.g., 3->1, 7->6 and 5->4. The distance between $Cluster_3$ from $Q_1$ to $Cluster_3$ from $Q_2$ equals 2 as Element 2 occurs in both clusters and we have to do one renaming, i.e. 0->9, and add one new element 8. In one scenario, the overall cost of a matching between two clusterings is equal to the sum of the cost of the matched clusters. In FIG. 7A, the overall cost equals 9. The cost is identical to the value of the quality indicator from FIG. 6 A.

FIG. 7B depict the optimal matching [717, 719, 721] of the clusters which leads to a minimal overall cost, according to one example embodiment. In one scenario, the minimal overall cost generated is 3, this value is identical to the value of the quality indicator in FIG. 6 B. In one scenario, the crucial question is how to compute optimal cluster matching. For the 3 clusters there exist 3!=9 different matching. For 10 clusters there exist 10!=3,628,800 many matching and for 20 clusters there are 20!=2,432,902,008,176,640,000 many matching. In the traffic pattern domain, there are several hundred different clusters, i.e., traffic pattern representatives, and the computation of all these matching is not feasible. As a result, computation of the optimal matching is recommended by the steps represented in FIG. 8, FIG. 9, FIG. 10 and FIG. 11:

FIG. 8 represents a complete weighted bipartite graph between two consecutive clustering, according to one example embodiment. This is the first step to compute the optimal matching. The weighted complete bipartite graph is:

A Graph G=(V, E) consists of a (finite) set of vertices V and a set of edges $E \subseteq V \times V$. A weighted graph is a graph G=(V, E) together with a weight function w: $E \to \mathbb{R}$. A bipartite graph is a graph G=(X∪Y, E) with X∩Y=∅ and $E \subseteq X \times Y$. A bipartite graph G=(X∪Y,E) is called complete if E=X×Y.

In one scenario, the distances between two clusters are marked with integer values inside the gray circles. The overall runtime for computing this completed weighted bipartite graph is equal to $O(P^2)$, where P denotes the number of clusters, i.e. pattern representatives. In one example embodiment, if there is a matching between cluster 1 (801) of the first clustering to cluster 2 (803) of the second clustering the cost is 1. On the other hand, the cost of matching cluster 1 (801) of the first clustering to cluster 1 (807) of the second clustering is 4 (809). Similarly, the cost of matching cluster 1 (801) of the first clustering to cluster 3 (811) of the second clustering is 4. This graph is the input for the Kuhn and Munkres algorithm, wherein the graph accesses the weight, and then the algorithm computes the minimal matching as shown in FIG. 9.

Figure 9:
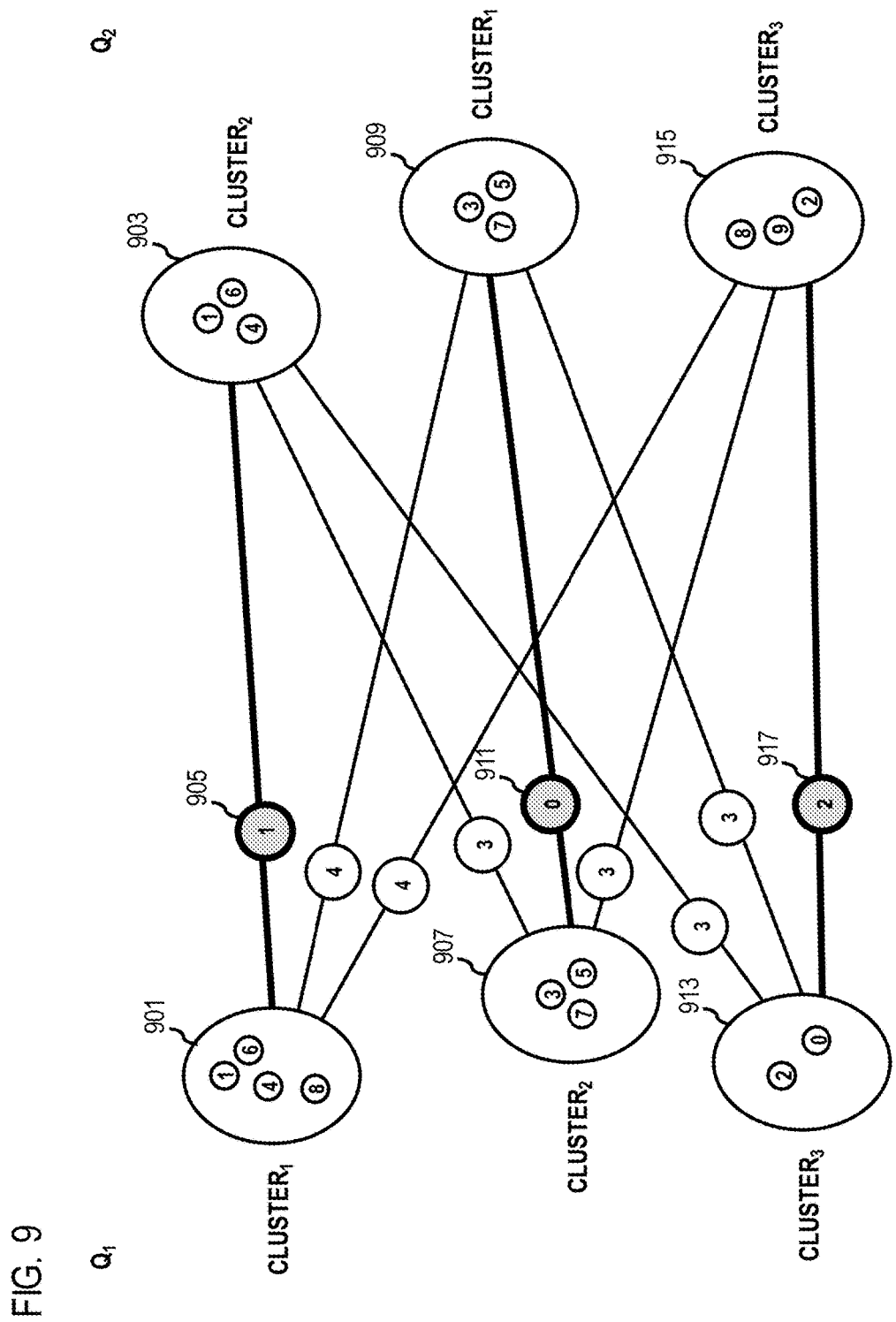
FIG. 9 represent the minimal matching of one or more clusters, according to one example embodiment.

FIG. 9 represents the minimal matching of one or more clusters, according to one example embodiment. This is the second step to compute the optimal matching. In one scenario, a minimum weight perfect matching is computed via Kuhn and Munkres algorithm. The algorithm runs in $O(P^3)$ rather than in $O(P!)$, where P denotes the number of clusters in each clustering. In one example embodiment, there may be a weighted complete bipartite graph G=(X∪Y, E) with the weight function w:X×Y→IR. As dummy vector may be used, there is an assumption w.l.o.g that X and Y to have equal cardinality k. The goal of the Kuhn-Munkres algorithm is to find a maximal weight matching in G. To obtain a minimal weight matching the following trick can be used, wherein the weight function w is replaced by the function w' with w'(x, y)=−w(x, y) and apply the algorithm to G and w'. In one scenario, FIG. 9 computes minimal matching between one or more clusters of different clusterings. For example, minimal matching between cluster 1 (901) of the first clustering and cluster 2 (903) of the second clustering is determined to be 1 (905). Correspondingly, minimal matching between cluster 2 (907) of the first clustering and cluster 1 (909) of the second clustering is determined to be 0 (911). Further, minimal matching between cluster 3 (913) of the first clustering and cluster 3 (915) of the second clustering is determined to be 2 (917).

Figure 10:
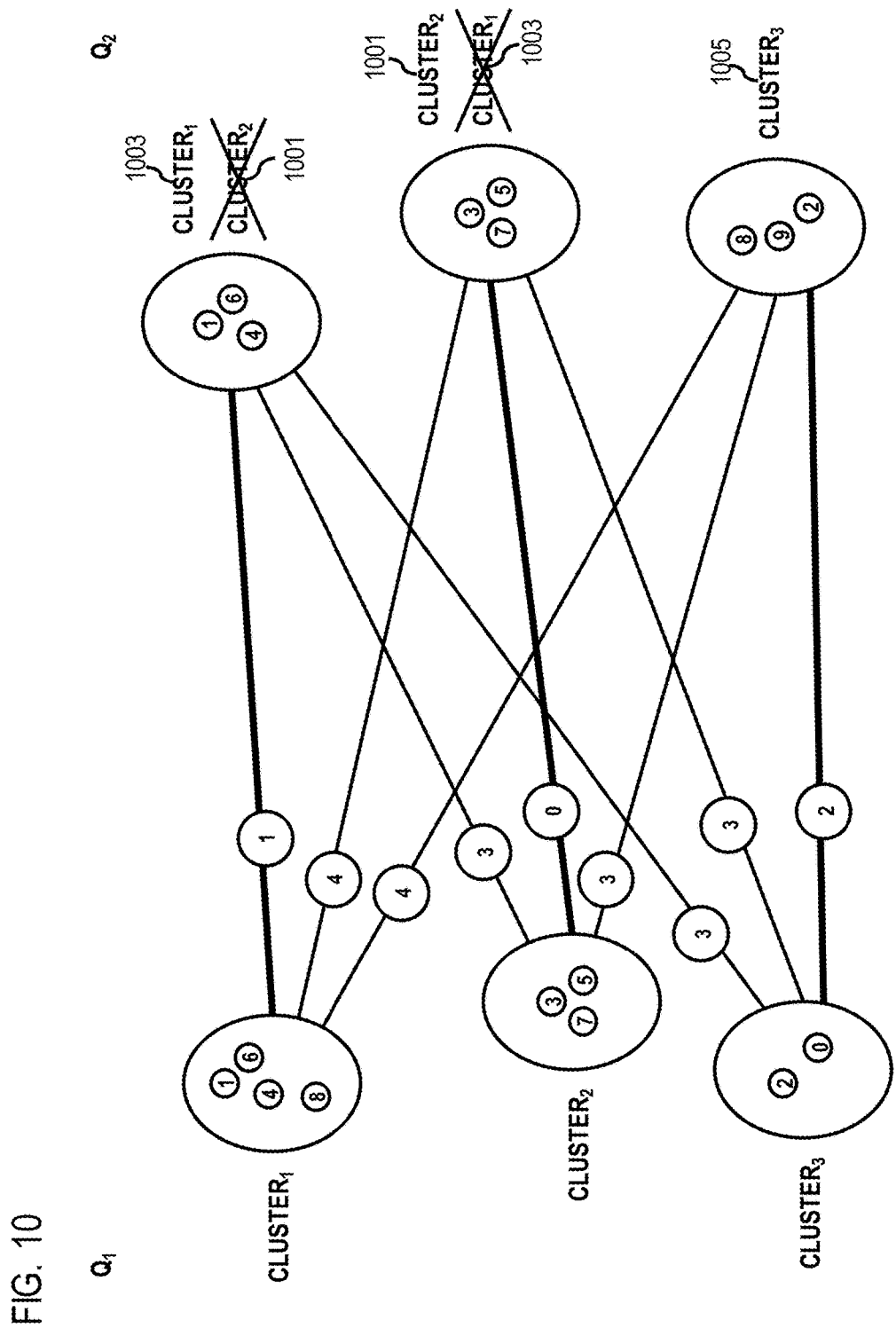
FIG. 10 is a diagram that represents re-enumeration of the clusters of the new clustering based on the minimal matching, according to one example embodiment.

FIG. 10 is a diagram that represents re-enumeration of the clusters of the new clustering based on the minimal matching, according to one example embodiment. This is the third step in computing the optimal matching. In one scenario, the clustering from the newer quarter is renamed, for example, the clustering from $Q_2$, according to the minimal matching. In one scenario, each cluster in the clustering gets assigned the number of the cluster to which it is mapped from the previous clustering. For example, as depicted in the figure, $Cluster_2$ [1001] is renamed as $Cluster_1$ [1003], whilst $Cluster_1$ [1003] is renamed as $Cluster_2$ [1001], and $Cluster_3$ is not renamed. In one scenario, this works in O (P) time with P being the number of clusters. In another scenario, the complex algorithms with an overall runtime complexity of O $(P^2+P^3+P)=O(P^3)$ are done in order to re-enumerate the clusters of the new clustering. This reduces the size of the incremental update package considerably.

Figure 11:
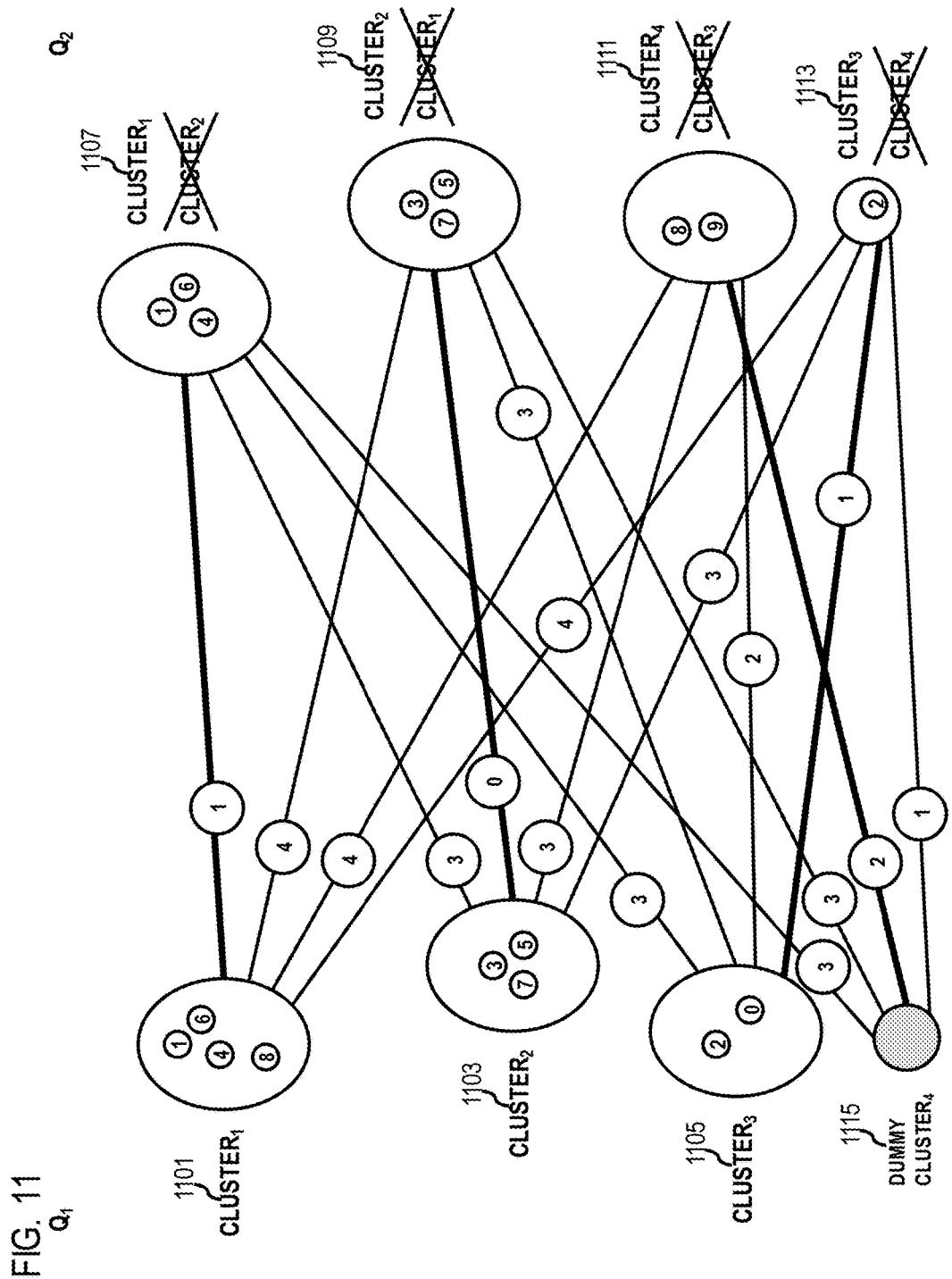
FIG. 11 represents the process of adding dummy clusters to the clustering having smaller number of clusters until both clustering have similar cardinality, according to one example embodiment.

FIG. 11 represents the process of adding dummy clusters to the clustering having smaller number of clusters until both clustering have similar cardinality, according to one example embodiment. In one scenario, both the clustering may have the same cardinality, i.e. the same number of clusters. The proposed Kuhn-Munkres algorithm for computing a minimal matching requires that the clustering have the same cardinality. If the clustering do not have the same number of clusters, dummy clusters may be added to the clustering having the smaller number of clusters, until both clustering have the same cardinality again. These dummy clusters are completely empty. In one scenario, the first clustering contains 3 clusters [1101, 1103, 1105] while the second clustering contains 4 clusters [1107, 1109, 1111, 1113]. As a result, one dummy cluster [1115] may be added to the first clustering to achieve clustering of the same cardinality. In another scenario, there might exist different minimal matching. For instance, in FIG. 11 one may match $Cluster_3$ with $Cluster_3$, and $Cluster_4$ with $Cluster_4$. This would lead to the same overall cost of 4.

The processes described herein for causing a minimal matching and/or renaming of one or more clusters representing various traffic patterns to reduce the value of quality indicator to provide for smaller incremental updates may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
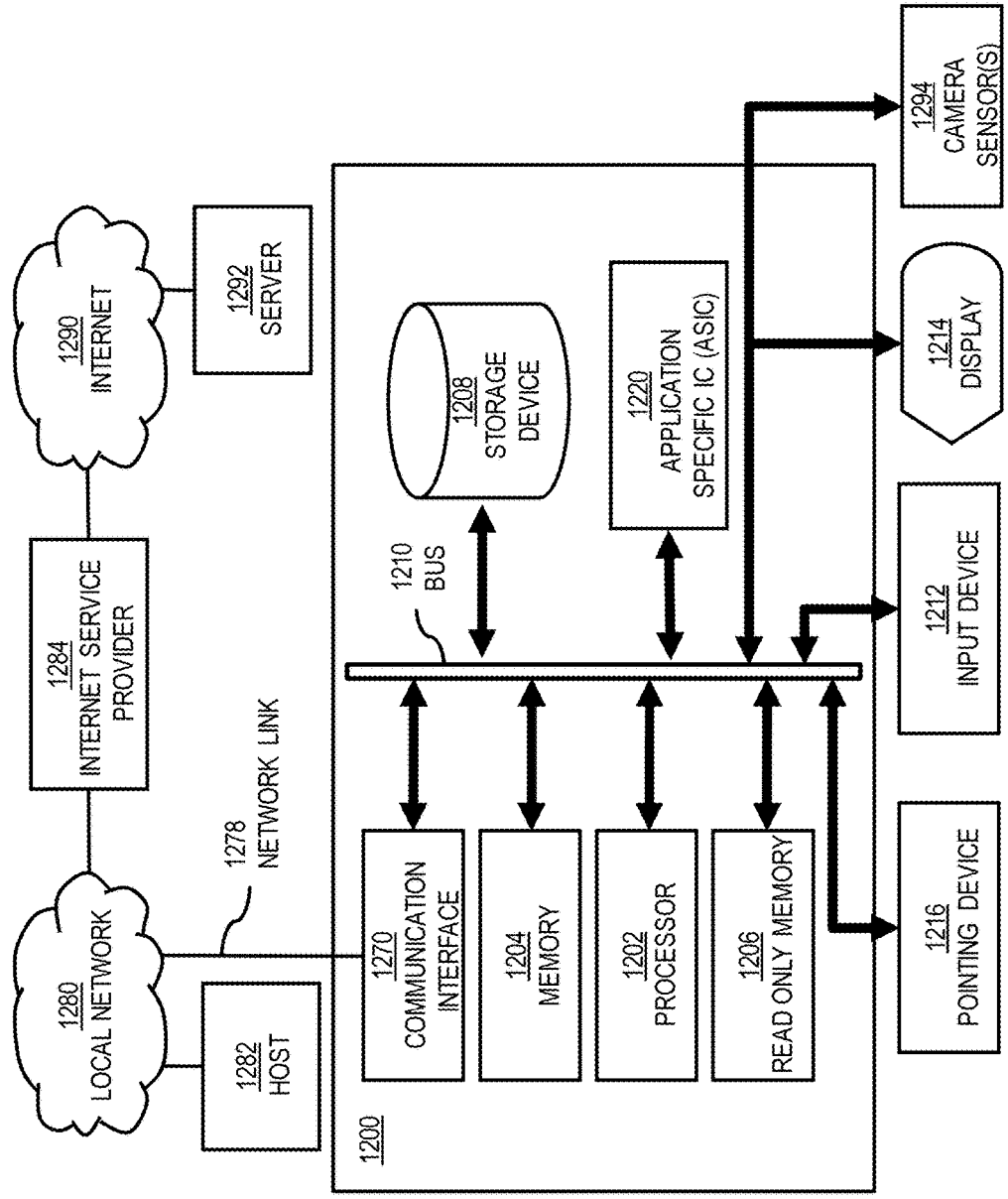
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to cause a minimal matching and/or renaming of one or more clusters representing various traffic patterns to reduce the value of quality indicator to provide for smaller incremental updates as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of causing a minimal matching and/or renaming of one or more clusters representing various traffic patterns to reduce the value of quality indicator to provide for smaller incremental updates.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to causing a minimal matching and/or renaming of one or more clusters representing various traffic patterns to reduce the value of quality indicator to provide for smaller incremental updates. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1200 also includes a memory 1204 coupled to bus 1210. The memory 1204, such as a random access memory (RAM) or any other dynamic storage device, stores information including processor instructions for causing a minimal matching and/or renaming of one or more clusters representing various traffic patterns to reduce the value of quality indicator to provide for smaller incremental updates. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for causing a minimal matching and/or renaming of one or more clusters representing various traffic patterns to reduce the value of quality indicator to provide for smaller incremental updates, is provided to the bus 1210 for use by the processor from an external input device 1212, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214, and one or more camera sensors 1294 for capturing, recording and causing to store one or more still and/or moving images (e.g., videos, movies, etc.) which also may comprise audio recordings. In some embodiments, for example, in embodiments in which the computer system 1200 performs all functions automatically without human input, one or more of external input device 1212, display device 1214 and pointing device 1216 may be omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 107 for causing a minimal matching and/or renaming of one or more clusters representing various traffic patterns to reduce the value of quality indicator to provide for smaller incremental updates to the UE 101.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to cause a minimal matching and/or renaming of one or more clusters representing various traffic patterns to reduce the value of quality indicator to provide for smaller incremental updates as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of causing a minimal matching and/or renaming of one or more clusters representing various traffic patterns to reduce the value of quality indicator to provide for smaller incremental updates.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to cause a minimal matching and/or renaming of one or more clusters representing various traffic patterns to reduce the value of quality indicator to provide for smaller incremental updates. The memory 1305 also stores the data associated with or generated by the execution of the inventive steps.

Figure 14:
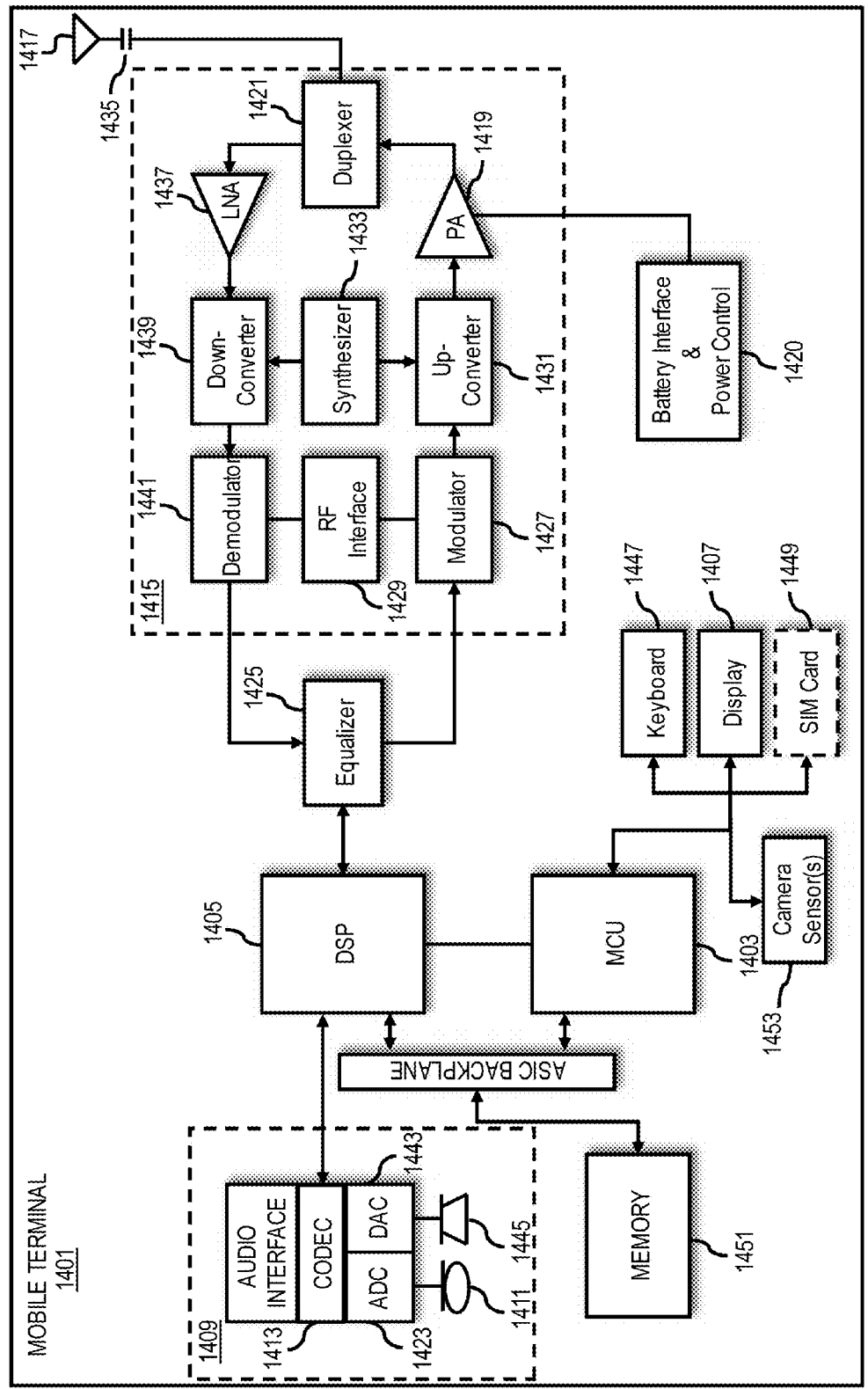
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of causing a minimal matching and/or renaming of one or more clusters representing various traffic patterns to reduce the value of quality indicator to provide for smaller incremental updates. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of causing a minimal matching and/or renaming of one or more clusters representing various traffic patterns to reduce the value of quality indicator to provide for smaller incremental updates. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to cause a minimal matching and/or renaming of one or more clusters representing various traffic patterns to reduce the value of quality indicator to provide for smaller incremental updates. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

Further, one or more camera sensors 1453 may be incorporated onto the mobile station 1401 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of reducing a size of at least one incremental navigation update package sent to a mobile navigation device comprising:
   receiving traffic data at a traffic server sent from a plurality of navigational devices over a communication network, the traffic server comprising a processor and a memory that stores the traffic data, wherein the processor:
   determines at least one first cluster set associated with at least one database of navigable links at a first time period and at least one second cluster set associated with the at least one database at a second time period, wherein each of the at least one first cluster set and the at least one second cluster set includes one or more clusters of the navigable links organized based on traffic pattern information;
   computes a minimal matching between at least one first cluster set and the at least one second cluster set using at least one algorithm of a minimal overall runtime complexity that determines a minimal number of elementary operations on the one or more clusters of the at least one first cluster set to transform the at least one first cluster set into the at least one second cluster set;
   reorders the one or more clusters in the at least one second cluster set using an order determined based on the minimal matching; and
   creates the at least one incremental navigation update package based, at least in part, on the reordering, wherein the at least one incremental navigation update package includes a minimal number of updates which transform the at least one first cluster set into the at least one second cluster set; and
   sends the at least one incremental navigation update package to the mobile navigation device for determining real-time route navigation for a vehicle, a user, or a combination thereof.

2. A method of claim 1, wherein the elementary operations include a delete operation, a rename operation, an add operation, or a combination thereof, of one or more navigable links of the one or more clusters of the at least one first cluster set.

3. A method of claim 1, wherein the processor further:
   determines at least one weighted bipartite graph between the at least one first cluster set and the at least one second cluster set using the at least one algorithm, wherein the minimal matching is selected from the at least one weighted bipartite graph.

4. A method of claim 1, wherein the processor further:
   determines that the at least one first cluster set and the at least one second cluster set do not have a same cardinality of clusters; and
   adds one or more dummy clusters to the at least one first cluster set, the at least one second cluster set, or a combination thereof to cause the at least one first cluster set and the at least one second cluster set to have the same cardinality prior to the computation of the minimal matching.

5. A method of claim 1, wherein the reordering includes a re-enumeration of the one or more clusters respectively in the at least one first cluster set, the at least one second cluster set, or a combination thereof.

6. A method of claim 1, wherein the processor further:
   initiates an arbitrary matching, an optimal matching, or a combination thereof between the at least one first cluster set and the at least one second cluster set.

7. A non-transitory computer-readable storage medium carrying one or more sequences of one or more instructions store thereon executed by a traffic server configured to reduce a size of at least one incremental navigation update package sent to a mobile navigation device, by:
   determining at least one first cluster set associated with at least one database of navigable links at a first time period and at least one second cluster set associated with the at least one database at a second time period, wherein each of the at least one first cluster set and the at least one second cluster set includes one or more clusters of the navigable links organized based on traffic pattern information;
   computing a minimal matching between at least one first cluster set and the at least one second cluster set using at least one algorithm of a minimal overall runtime complexity that determines a minimal number of elementary operations on the one or more clusters of the at least one first cluster set to transform the at least one first cluster set into the at least one second cluster set;
   reordering the one or more clusters in the at least one second cluster set, based on the minimal matching; and
   creating the at least one incremental navigation update package based, at least in part, on the reordering, wherein the at least one incremental navigation update package includes a minimal number of updates which transform the at least one first cluster set into the at least one second cluster set; and
   sending the at least one incremental navigation update package to the mobile navigation device for determining real-time route navigation for a vehicle, a user, or a combination thereof.

8. A non-transitory computer-readable storage medium of claim 7, wherein the traffic server is further configured to reduce the size of the at least one incremental navigation update package by:
   determining at least one weighted bipartite graph between the at least one first cluster set and the at least one second cluster set using the at least one algorithm, wherein the minimal matching is selected from the at least one weighted bipartite graph.

9. A non-transitory computer-readable storage medium of claim 7 wherein the traffic server is further configured to reduce the size of the at least one incremental navigation update package by:
   determining that the at least one first cluster set and the at least one second cluster set do not have a same cardinality of clusters; and
   adding one or more dummy clusters to the at least one first cluster set, the at least one second cluster set, or a combination thereof to cause the at least one first cluster set and the at least one second cluster set to have the same cardinality prior to the computation of the minimal matching.

10. A traffic server comprising a processor and a memory that stores traffic data received from a plurality of navigational devices over a communication network, wherein the processor:
- determines at least one first cluster set associated with at least one database of navigable links at a first time period and at least one second cluster set associated with the at least one database at a second time period, wherein each of the at least one first cluster set and the at least one second cluster set includes one or more clusters of the navigable links organized based on traffic pattern information;
- computes a minimal matching between at least one first cluster set and the at least one second cluster set using at least one algorithm of a minimal overall runtime complexity that determines a minimal number of elementary operations on the one or more clusters of the at least one first cluster set to transform the at least one first cluster set into the at least one second cluster set;
- reorders the one or more clusters in the at least one second cluster set using an order determined based on the minimal matching; and
- creates the at least one incremental navigation update package based, at least in part, on the reordering, wherein the at least one incremental navigation update package includes a minimal number of updates which transform the at least one first cluster set into the at least one second cluster set; and
- sends the at least one incremental navigation update package to the mobile navigation device for determining real-time route navigation for a vehicle, a user, or a combination thereof.

* * * * *